United States Patent [19]

Hickox

[11] 3,933,310
[45] Jan. 20, 1976

[54] ROCKET NOZZLE CONSTRUCTION AND SURFACES IMPERVIOUS TO HOT, HIGH VELOCITY GASES

[75] Inventor: Charles C. Hickox, Brigham City, Utah

[73] Assignee: Thiokol Corporation, Newtown, Pa.

[22] Filed: July 11, 1974

[21] Appl. No.: 487,521

[52] U.S. Cl. ..................... 239/265.43; 239/265.15
[51] Int. Cl.² .................... B64D 33/04; B64D 33/08
[58] Field of Search .................. 181/61, 62, 33 HD; 239/127.1, 265.11, 265.15, 265.33, 265.37, 265.43, 602

[56] References Cited
UNITED STATES PATENTS

| | | | |
|---|---|---|---|
| 2,737,019 | 3/1956 | Billman | 239/265.43 |
| 3,135,297 | 6/1964 | Nordberg et al. | 239/265.15 |
| 3,249,306 | 5/1966 | Altseimer | 239/127.1 |
| 3,449,189 | 6/1969 | Hatch | 239/265.11 UX |
| 3,465,967 | 9/1969 | Card | 239/265.43 X |
| 3,482,783 | 12/1969 | Nebiker et al. | 239/265.43 |

Primary Examiner—Robert S. Ward, Jr.
Attorney, Agent, or Firm—Stanley A. Marcus; Edward E. McCullough

[57] ABSTRACT

A thrust nozzle for a rocket has an improved exit cone made of a strong, refractory material with tufts of high temperature fibers anchored in it to form a pile, in the manner of a carpet. The pile is on the inside of the nozzle, so that propulsive gases of the rocket may impinge directly thereon. The exit cone may be either rigid, as is conventional, or foldable so that the rocket may be stored in a minimal space. The folded exit cone may be extended by any of various actuating systems when the rocket is launched. This pile construction may also be used for other surfaces that must be exposed to hot, high velocity gases.

10 Claims, 3 Drawing Figures

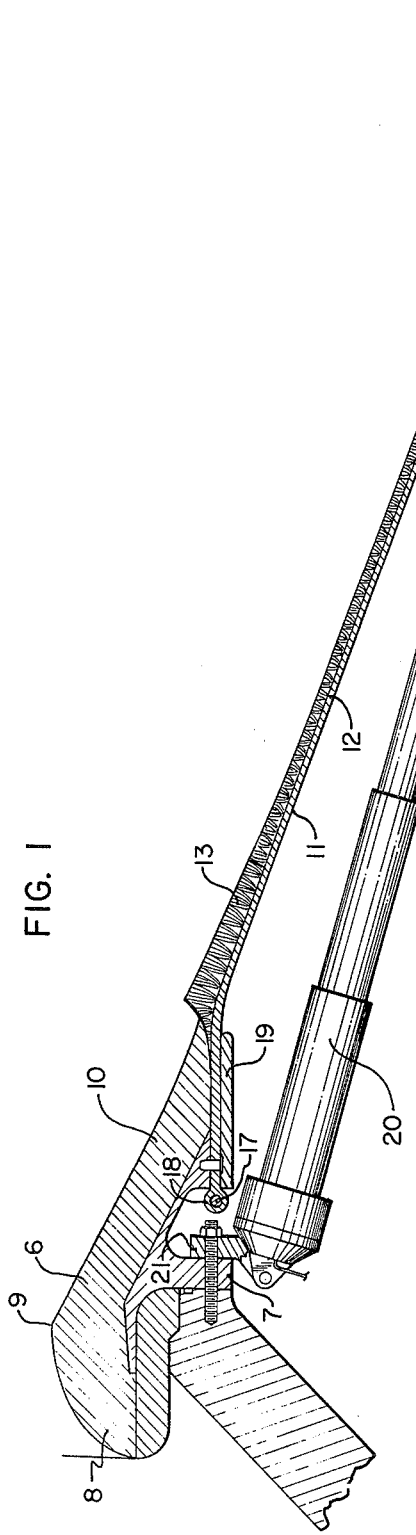
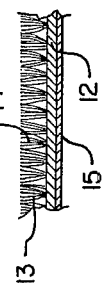
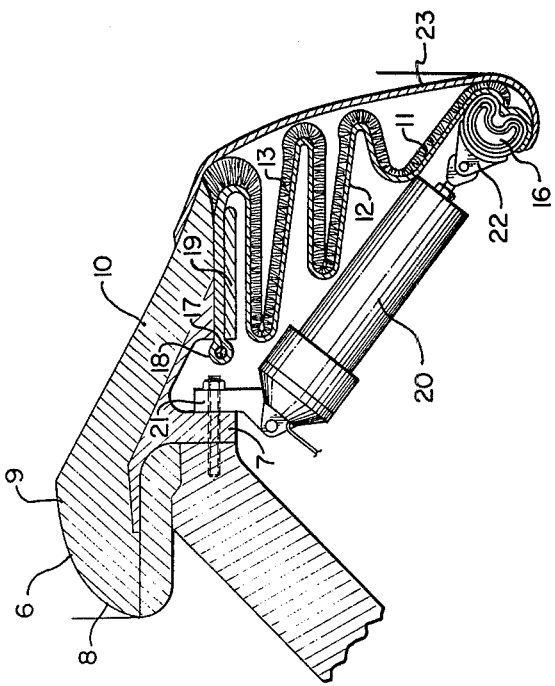

ROCKET NOZZLE CONSTRUCTION AND SURFACES IMPERVIOUS TO HOT, HIGH VELOCITY GASES

BACKGROUND OF THE INVENTION

This invention relates to construction of surfaces impervious to hot, high velocity gases; and particularly to rocket nozzles having a special, lightweight, pile insulation, permitting the exit cone to be foldable during storage and extendable when the rocket is launched.

Aerospace vehicles often have surfaces that must be exposed to high temperature, high velocity gases; e.g., the leading surface of a re-entry vehicle that must strike the atmosphere at high velocity, or the interior of a rocket nozzle that must withstand the propulsive gases of a rocket. Such surfaces must not or potentially withstand high temperatures and possible erosiveness of gases impinging thereon; but also must be light in weight in order to maximize payload payloand and range of vehicle.

Another problem, especially applicable to rockets, relates to the fact that they are often intended to be stored in restricted spaces, such as in submarines or in underground silos. Hence, the designer is faced with the problem of how to store a missile of maximum power and range in a given space. One disadvantageous characteristic of conventional rockets is that their thrust nozzles have rigid exit cones that are large and bulky and occupy a considerable portion of the total space allotted for storage of the missile. This restricts the amount of propellant that may be contained in the missile, and, hence, its range and payload.

SUMMARY OF THE INVENTION

According to the present invention, a pile formed of special, high strength, high temperature fibers may be used as an insulation material to protect surfaces from high temperature, high velocity gases.

It is especially useful in the construction of very lightweight exit cones for convergent-divergent rocket nozzles. Since the pile is much lighter in weight than conventional insulation materials for this purpose, the exit cone may be made of thin, light-weight material just strong enough to withstand the pressure loads imposed thereon by the propulsive gases of the rocket. Also, the pile insulation, being flexible rather than rigid, as in the conventional insulation, yields the surprising result of making possible the construction of a flexible, foldable, exit cone for rocket nozzles; so that the exit cone may occupy a minimal storage space.

This foldable exit cone may be made of a cloth woven from fibers of refractory materials such as carbon, graphite, silica, glass, or quartz. Densely packed tufts of fibers of these or other high temperature materials are anchored in the cloth by techniques similar to those used in the carpet making arts. Actuation means for extending the folded exit cone when the rocket is launched are attached to the aft end of exit cone and to some portion of the rocket that is not movable relative thereto.

Objects of the invention are to provide insulating means and construction for surfaces that must be exposed to hot, high velocity gases; to provide a foldable nozzle for rockets that will maximize the payload and range of a rocket relative to the space in which it must be stored; and to provide a lighter weight thrust nozzle for rockets.

Important features of the invention are that it is of simple construction, reliable, and easy to manufacture. Also, the pile thereof presents a compliant surface that does not amplify, reflect, or create turbulence in the propulsive gases; and the propulsive gases tend to force the fibers to nest together densely in a downstream direction, which virtually eliminates sealing problems or leakage of gas through the cloth.

DESCRIPTION OF THE DRAWINGS

FIG. 1 is a longitudinal half section of the foldable rocket nozzle of the invention in an extended position;

FIG. 2 is similar to FIG. 1, but shows the exit cone of the nozzle in its folded position; and FIG. 3 is an enlarged, fragmentary section of the exit cone of the rocket nozzle; as shown, it may represent either a rigid or foldable exit cone.

DESCRIPTION OF THE PREFERRED EMBODIMENTS

As shown in FIGS. 1 and 2, a convergent-divergent nozzle member 6 is equipped with an annular mounting flange 7 for attachment to a rocket motor, not shown. The nozzle member 6 defines a venturi orifice having a convergent portion 8, a throat 9, and a divergent cone 10.

A foldable exit cone 11 has a backing 12 comprising a hollow, truncated cone preferably made of a thin, flexible material that may be folded so that it may be collapsed during storage, as shown in FIG. 2. In the preferred embodiment, the hollow cone 12 is made of cloth woven from quartz-fiber yarn. However, it may be made of any of various other refractory materials such as fibers of carbon, graphite, silica, glass, or high temperature metals. A pile 13 is formed on the inside surface of the cone 12 by anchoring tufts 14 of carbon fibers in the woven structure of the cone 12. This is done in a manner well-known in the art of carpet making. Although carbon is a preferred material for these tufts 14, other materials may be used, such as those cited above for use in the hollow cone 12. An elastomer 15 is applied to the outer surface of the cone 12 to assist in locking the tufts 14 into the woven structure thereof. However, this is optional and is unnecessary when the structures of the cone 12 and the pile 13 are sufficiently dense. When extended, the aft end of the exit cone 11 is supported by an inflatable torus 16 that is made of a dimensionally stable material such as nylon cloth impregnated with rubber. This also is optional and may be replaced by other means of reinforcing the exit cone 11. The forward end of the exit cone 11 is sewn around a wire cable 17 to form an annular bead 18, whereby the exit cone 11 may be retained to the nozzle member 6 by annular wrappings of quartz filaments 19 impregnated with a phenolic resin.

A plurality of telescoping, fluid-operated actuators 20 surrounds the nozzle. Each is fastened at its forward end to the mounting flange 7 by a special bracket 21, to which the actuator 20 is pivoted. Each actuator 20 is also attached at its aft end to the torus 16 via a bracket 22, to which the actuator 20 is pivoted. During storage, the exit cone 11 is folded as shown in FIG. 2 and is protected by an annular sheet 23 of silicone rubber. When the rocket is launched, the actuators 20 automatically extend the exit cone 11 and the sheet of rubber 23 is automatically ejected.

The pile 13 in the preferred embodiment is approximately one inch deep at its forward end to promote a smooth flow of propulsion gases over the transition from the nozzle member 6 to the exit cone 11. It then tapers to a constant depth of 0.2 inches.

This pile 13 may be modified in a great variety of ways for specific applications. For example, short, thin fibers may be densely packed to trap a protective boundary layer of gases therein; and thicker, longer fibers may be interspersed therewith to function as guard hairs to protect the denser portion of the pile from impingement by hard, erosive particles commonly contained in propulsive gases of rockets. Also, the depth of the pile 13 may be regulated to achieve the desired rate of heat transfer through the exit cone 11, so that it may be in effect radiation cooled to a certain extent. Although the preferred embodiment is a cloth cone 12 in which the pile is attached in the form of tufts 14, this pile may be attached to the hollow cone 12 in other ways, such as bonding or molding one end of each fiber thereto. Also, the pile 13 may be cut or left in loops, although in the preferred embodiment it is cut, so that one end of each fiber is free.

It should be noted that the structure described for the exit cone 11 may also be applied to virtually any surface that must be exposed to hot, high velocity gases, such as the leading surface of a re-entry vehicle. Also, the exit cone 12 protected by the pile 13 may be of the conventional, rigid type, as well as flexible and foldable as described above.

An important feature of the invention is that, in addition to functioning as an insulator, the pile 13, being a compliant surface, tends to dampen oscillations and other turbulence in the propulsive gases so that a very thin material may be used for the hollow cone 12 without danger of fluttering orpotentially damaging oscillations that may otherwise be induced by the propulsive gases.

An invention has been described that constitutes an advance in rocket technology; and although details have been set forth with considerable specificity, it should be noted that many such details may be altered without departing from the scope of the invention as it is defined in the following claims. For example, the actuation means for extending the exit cone may be any of a variety of devices, such as hydraulic or pneumatic actuators, inflatable devices attached to the exit cone, spring-biased steel bands that form tubes, etc. The invention claimed is:

1. In a convergent-divergent, thrust nozzle for rockets, the improvement comprising:

a light-weight exit cone forming at least a portion of the divergent part of the nozzle, comprising a hollow, truncated cone and densely packed, refractory fibers anchored to the truncated cone so that the fibers extend inwardly to form a pile of the inner surface of the cone.

2. The rocket nozzle of claim 1 wherein the fibers forming the pile are oriented in a downstream direction.

3. The rocket nozzle of claim 1 wherein the hollow-truncated cone is made of a thin, flexible material that may be folded, so that the exit cone may be collapsed for storage and extended when the rocket is launched, and further includes actuation means for extending the exit cone.

4. The rocket nozzle of claim 3 wherein the thin, flexible material of the exit cone is a refractory cloth, and the fibers are anchored in the weave thereof in the manner of carpet pile.

5. The rocket nozzle of claim 4 wherein the cloth and fibers are selected from the group consisting of carbon, graphite, silica, glass, and quartz, and mixtures thereof.

6. The rocket nozzle of claim 1 further including a sealant material on the hollow, truncated cone, to help anchor the fibers thereto.

7. The rocket nozzle of claim 3 wherein the actuation means comprises a plurality of fluid-operated actuators, each attached at one end to the aft end of the exit cone and at its other end to some part that cannot move relative to the rocket.

8. The rocket nozzle of claim 1 wherein the fibers are of varied lengths and diameters, so that shorter, thinner fibers may function to trap a boundary layer of gas, and longer, thicker fibers may function as a shield against impingement on the shorter fibers of hard, erosive particles commonly contained in propulsive gases of rockets.

9. The rocket nozzle of claim 1 including an inflatable torus fixed to the aft end of the exit cone for support thereof.

10. A thrust nozzle for rockets, comprising:
a convergent-divergent nozzle member;
an exit cone fixed to the aft end of the nozzle member and comprising a hollow, truncated cone of refractory cloth that may be folded, and tufts of refractory fibers anchored in the weave of the cloth and forming a pile on the inner surface of the cone; and
a plurality of fluid operated actuators surrounding the nozzle, each attached at one end of the aft portion of the exit cone and at its other end to the nozzle member, for extension of the foldable exit cone when the rocket is launched.

* * * * *